3,439,379
THERMOPLASTIC INSTALLATION APPARATUS
Richard H. Graf, Hauppauge, N.Y., assignor to Hooker Chemical Corporation, Niagara Falls, N.Y., a corporation of New York
Filed Oct. 24, 1965, Ser. No. 504,337
Int. Cl. B29b 3/00; F27b 9/28
U.S. Cl. 18—1
6 Claims

ABSTRACT OF THE DISCLOSURE

There is provided an apparatus for dispensing coiled thermoplastic material in a condition suitable for installation on a support which comprises in combination a housing, a rotatable holding means within said housing, bearing means rotatably mounting said holding means within said housing, an aperture in said housing, and heating means disposed in said housing so as to provide heat throughout said housing. In a preferred embodiment an elongated flexible sleeve is attached to the housing at the aperture.

---

This invention is useful in any application in which thermoplastic material stock is stored in a coiled condition, but in which it is desired to apply the thermoplastic material in a straightened or flat condition. Thus, the invention is useful in the application of thermoplastic handrail covering material to a support, to the application of plastic decorative moldings to a workpiece, to the application of plastic tubing in various installations, and the like. In such applications, the thermoplastic material is generally in a rigid state in its coiled condition at atmospheric temperature, and is thereby difficult to manipulate. Therefore, it is desirable to provide a method for heating the thermoplastic material to facilitate the handling thereof. For this invention to be more readily understood, it will be described with particular reference to applying thermoplastic handrail material onto a support. However, it is to be understood that this is a specific embodiment of the invention, and is not intended to limit the invention.

Present handrail installation methods are costly, time-consuming and inefficient. One of the factors contributing to installation difficulties is the lack of suitable storage facilities that permit efficient dispensing of a heated handrail material onto the workpiece. Prior art methods have involved the unwinding of the coiled thermoplastic material, heating the thermoplastic material in a cumbersome blower and sleeve device, and then placing it on the railing support. The prior art methods often result in the handrail material becoming scratched or soiled in the installation process. These disadvantages are eliminated by the apparatus and method of the invention. Moreover, the prior art methods are accompanied by high labor costs compared to the costs involved in installing handrail material in accordance with the invention.

An object of the invention is to provide an improved installation apparatus which provides for the ready heating, storage and dispensing of large quantities of coiled thermoplastic material. The heating of the plastic material makes it flexible so that it is easily shaped and formed on the workpiece. The storage capacity of the apparatus can be varied by design to accommodate hundreds of feet of handrail material, which can be heated at one time, dispensed from the machine, and installed directly onto a support. The apparatus is preferably provided with an insulated jacket, so that the plastic material can be heated to the desired degree of flexibility, the heaters can be turned off and the insulated jacket maintains the temperature of the plastic material at a level sufficient to keep it in the flexible condition. The plastic material can be maintained in a flexible condition for long periods of time, thereby allowing the fast application of the material to the workpiece.

Further advantages of the invention will become apparent from the following description, wherein the invention is further described by reference to the accompanying drawings.

Figure 1:
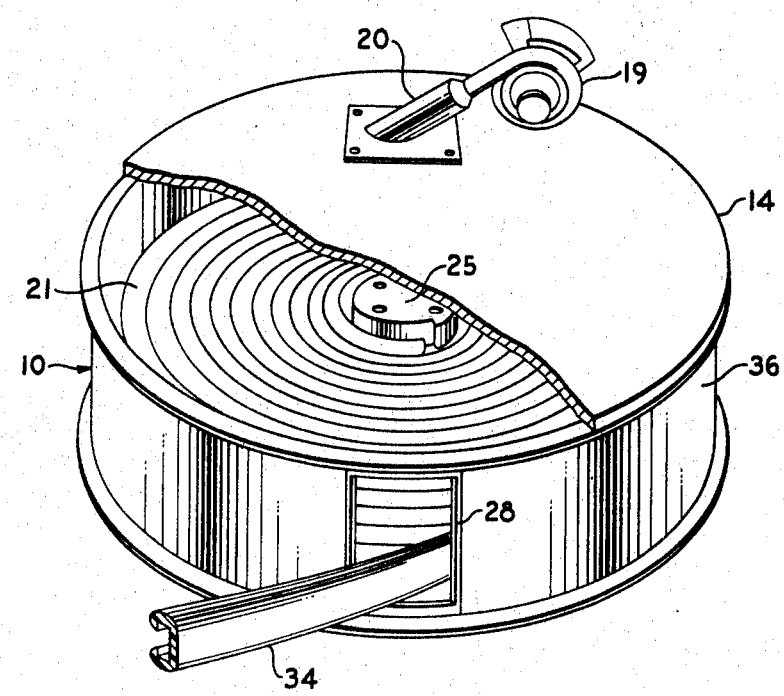
FIGURE 1 is a perspective view of the installation apparatus with part of the top portion of the apparatus cut away to expose a coil of handrail material as it appears in the apparatus.
Figure 2:
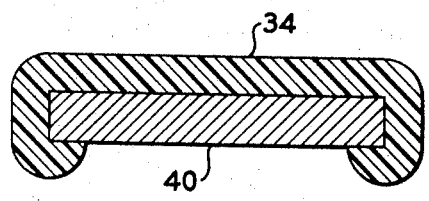
FIGURE 2 is a profile view of thermoplastic handrail material as it appears on a support. The handrail material has basically a U-channel shape provided with undergrips for holding the handrail material onto the support.
Figure 3:
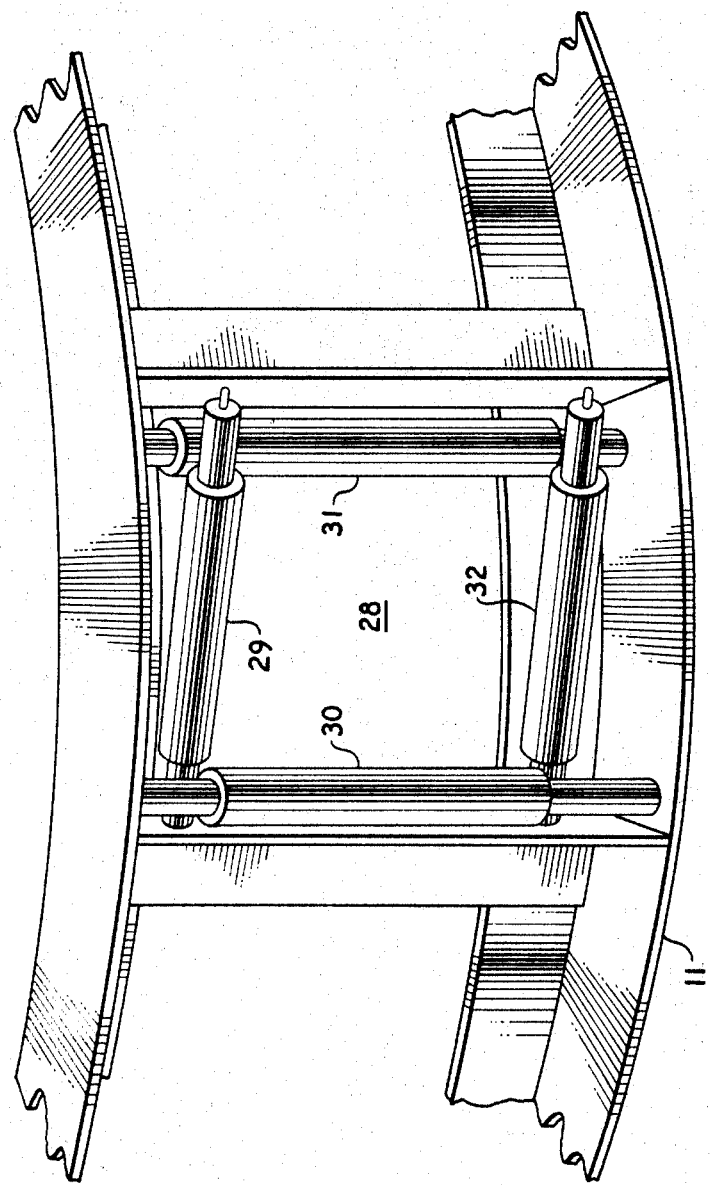
FIGURE 3 is a detailed view of the aperture through which the handrail material is dispensed from the apparatus.
Figure 4:
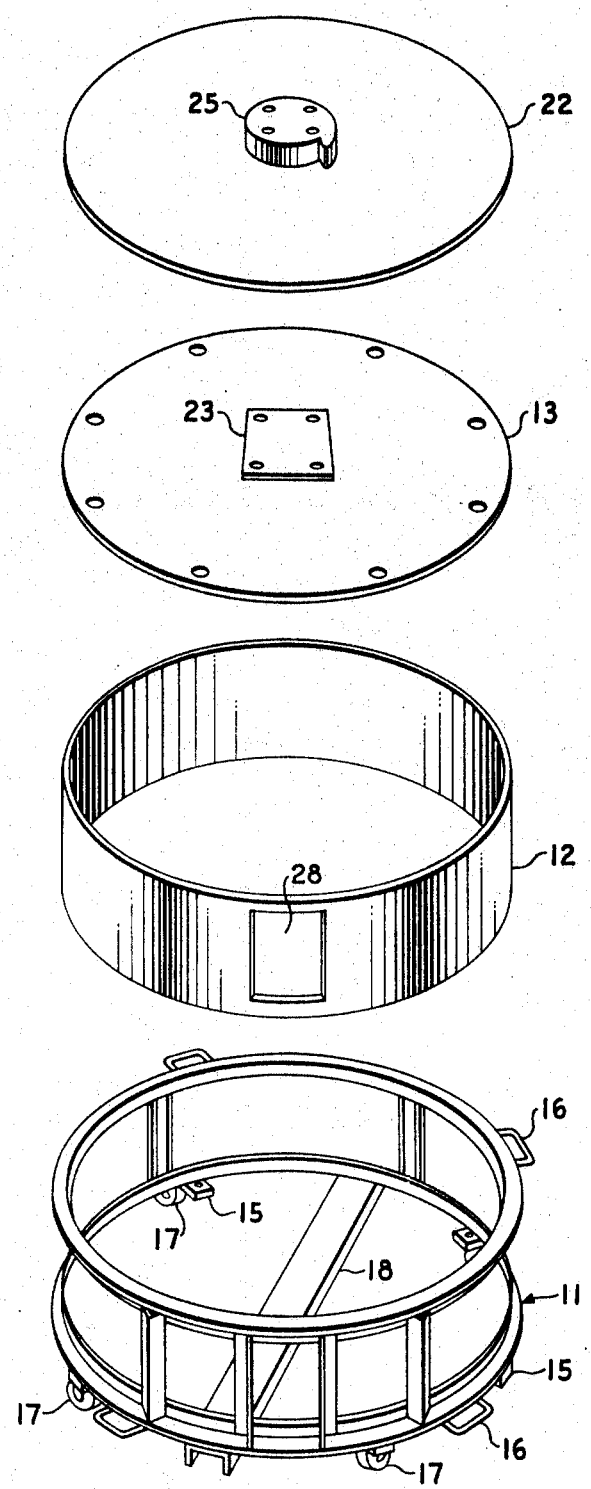
FIGURE 4 is an exploded view of the apparatus of the invention.

Referring to the drawings in more detail, and the preferred embodiments shown therein, a vertically disposed cylindrical housing 10 for the apparatus of the invention is comprised of a frame 11, a liner 12, a stationary bottom 13, and a removable cover 14. The frame has affixed thereto tabs 15, handles 16, casters 17, and support member 18. Mounted on the tabs 15 and the support member 18 is the stationary bottom 13. The liner 12, which can be made of a light gauge sheet metal, is inserted within the frame 11 and supported by the stationary bottom 13. The removable cover 14 rests atop the frame 11 and can be affixed thereto by suitable fasteners (not shown). One or more suitable heaters are mounted in the removable cover 14, such as the combination heater-blower 19, inserted in adapter 20 as shown in FIGURE 1. Alternatively, strip heaters and other types of heating devices can be employed to provide sufficient heat within the housing 10 for softening the coiled thermoplastic material 21.

Figure 5:
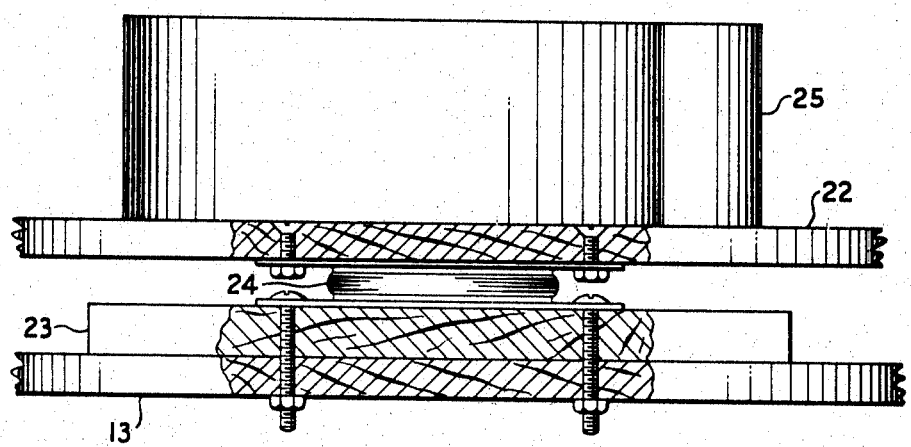
FIGURE 5 is a detailed side elevation of the lazy susan bearing mounting.

A holding means such as circular, rotatable table 22 is mounted within housing 10 on the stationary bottom 13. As shown in FIGURE 5, a spacer plate 23 is attached to the stationary bottom 13. Mounted on the spacer plate is a lazy susan bearing 24 which permits free rotation of the rotatable table 22, which is mounted atop the lazy susan bearing 24. Mounted atop the rotatable table 22 is a center block 25 around which the coiled thermoplastic material is located on the rotatable table. The center block 25 is shaped with a notch which serves to stabilize the coil of thermoplastic material to prevent slippage of the coil on the rotatable table 22.

The housing 10 is provided with an aperture 28 in the vertically disposed side thereof, which is fitted with roller assemblies 29, 30, 31 and 32. These roller assemblies facilitate movement of the handrail 34 from the housing 10 through the aperture 28 without scratching or otherwise damaging the handrail material.

Figure 6:
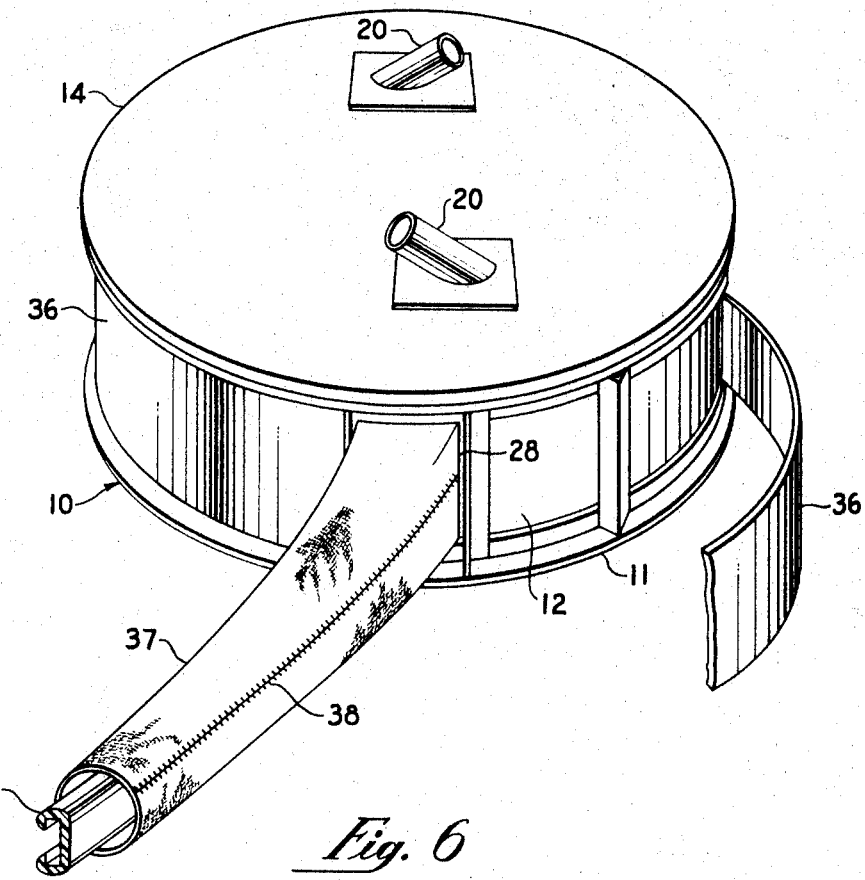
FIGURE 6 is a perspective view of the apparatus of the invention showing an insulating jacket, and a fabric sleeve attached to the aperture through which the handrail material is dispensed.

As shown in FIGURE 6, the housing 10 can be equipped with an insulated jacket 36 which serves to maintain the desired temperature within the housing 10. For use in certain application, the housing 10 can also be equipped with a flexible sleeve 37 adapted to be attached to aperture 28. The flexible sleeve 37 can be made of any suitable material such as canvas or a fabric, and is equipped with a zipper 38. The flexible sleeve 37 is preferably tapered to be narrower in diameter or width at its open end than at the end of the sleeve attached to aperture 28. The flexible sleeve 37 is especially useful for maintaining the thermoplastic material in a heated condition and for preventing scratching and/or soiling of the thermoplastic material as it is removed from the housing 10, especially in applications wherein the thermoplastic material might tend to drag on the ground or floor.

In operation, one or more coils of handrail material are stacked on the rotatable table 22. The removable cover 14 is placed on the frame 11, and the heaters 19 are turned on. After the coiled thermoplastic material has been heated sufficiently to render it sufficiently flexible and workable for straightening and for ready application to the support, one, end of the handrail material 34 is pulled through the aperture 28 and is applied to the support 40 by spreading the undergrips so that they snap around the support member. As the hand rail material cools, it again becomes rigid so that the handrail material cannot be readily removed from the support member. As the handrail 34 is pulled through aperture 28 the coil of handrail material rotates in combination with the rotatable table 22. Scratching of the handrail material by the edges of the aperture is prevented by the roller assemblies such as 29, which rotate freely with the movement of the handrail 34.

The preferred type of handrail material for use in the apparatus of the invention is polyvinyl chloride. However, the thermoplastic material can suitably be any other normally solid, thermoplastic. Other suitable thermoplastics include the polyolefins, such as polyethylene, polypropylene, copolymers of ethylene with higher olefins, polystyrene, thermoplastic butadiene polymers and copolymers, such as butadiene-styrene block copolymers; and other polythenic compositions such as polyvinyl chloride-acetate copolymer, polyvinylidiene chloride, acrylic polymers, and the like. Various other modifications of this invention can be made without departing from the underlying principles of the invention.

What is claimed is:

1. Apparatus for heating and dispensing coiled thermoplastic material which comprises in combination a housing comprised of a frame, a stationary bottom, a removable cover, and a cylindrical line; a circular, rotatable table disposed in said housing and adapted to receive coiled thermoplastic material; bearing means rotatably mounting said table on said bottom; an aperture in said liner having roller means positioned along the edges of said aperture to prevent injury to the thermoplastic material as it is dispensed through the aperture; heating means disposed in said removable cover, and insulating means mounted on said housing.

2. Apparatus in accordance with claim 1 wherein an elongated flexible sleeve is attached to the housing at the aperture.

3. Installation apparatus which comprises in combination a housing, a rotatable holding means within said housing, bearing means rotatable mounting said holding means within said housing, an aperture in said housing having roller means positioned along the edges of said aperture, and heating means disposed in said housing.

4. Installation apparatus which comprises in combination a cylindrical housing, a rotatable table within said housing, bearing means rotatably mounting said table on the bottom of said housing, an aperture in said housing having roller means positioned along the edges of said aperture, and heating means disposed in said housing.

5. Apparatus in accordance with claim 4 wherein an elongated flexible sleeve is attached to the housing at the aperture.

6. Installation apparatus which comprises in combination a cylindrical housing, a rotatable table within said housing, bearing means rotatably mounting said table on the bottom of said housing, an aperture in said housing, an elongated flexible sleeve attached to the housing at the aperture, heating means disposed in said housing, and insulating means mounted on said housing.

References Cited

UNITED STATES PATENTS

| | | | |
|---|---|---|---|
| 62,089 | 2/1867 | Towers | 25—142 XR |
| 2,973,568 | 3/1961 | Greger | 25—142 XR |
| 2,988,349 | 6/1961 | Blackman et al. | 263—3 |
| 3,095,186 | 6/1963 | Sondy | 25—142 XR |

WILLIAM J. STEPHENSON, *Primary Examiner.*

U.S. Cl. X.R.

263—3

PO-1050
(5/69)

UNITED STATES PATENT OFFICE
CERTIFICATE OF CORRECTION

Patent No. 3,439,379             Dated April 22, 1969

Inventor(s) Richard H. Graf

It is certified that error appears in the above-identified patent and that said Letters Patent are hereby corrected as shown below:

Column 3, lines 28-29, for "Howover" read --However--;
Column 3, line 44, for "line" read --liner--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents